(12) United States Patent
Skinner et al.

(10) Patent No.: US 6,928,300 B1
(45) Date of Patent: Aug. 9, 2005

(54) METHOD AND APPARATUS FOR AUTOMATED FLEXIBLE CONFIGURING OF NOTIFICATIONS AND ACTIVATION

(75) Inventors: Craig Skinner, Snohomish, WA (US); William Shu-woon Wong, Issaquah, WA (US); John Richard Brown, Lynnwood, WA (US)

(73) Assignee: PalmSource, Inc., Sunnyvale, CA (US)

( * ) Notice: Subject to any disclaimer, the term of this patent is extended or adjusted under 35 U.S.C. 154(b) by 768 days.

(21) Appl. No.: 09/710,156

(22) Filed: Nov. 9, 2000

(51) Int. Cl.[7] .............................................. H04M 3/00
(52) U.S. Cl. ................ 455/556.2; 455/418; 455/422.1; 455/566; 340/825.26; 708/109
(58) Field of Search ............................. 455/418, 414.1, 455/422.1, 556.1, 556.2, 566, 567, 574; 340/7.27, 825.26, 7.39; 708/109, 112, 135; 345/156, 150, 155; 55/404.1, 410, 412.1, 412.3, 414.1, 418, 421, 461, 459, 466, 41.2, 66.1, 566, 556.2; 709/223, 206

(56) References Cited

U.S. PATENT DOCUMENTS

| | | | | |
|---|---|---|---|---|
| 5,889,852 A | * | 3/1999 | Rosecrans et al. | 379/355.05 |
| 6,070,055 A | * | 5/2000 | Uchida | 455/566 |
| 6,131,046 A | * | 10/2000 | Sano et al. | 455/566 |
| 6,209,011 B1 | * | 3/2001 | Vong et al. | 708/112 |
| 6,317,593 B1 | * | 11/2001 | Vossler | 455/414.1 |
| 6,453,182 B1 | * | 9/2002 | Sprigg et al. | 455/574 |
| 6,836,656 B2 | * | 12/2004 | Nakae et al. | 455/418 |

* cited by examiner

Primary Examiner—David Hudspeth
Assistant Examiner—Kamran Afshar
(74) Attorney, Agent, or Firm—Berry & Associates P.C.

(57) ABSTRACT

A preferences option maintains preferences for enabling and disabling notifications for device(s) of an electronic device. The notifications are for any of e-mails, phone calls, or other communications, or events (datebook alarms, for example). One or more devices may produce notifications, and individual preferences for each device may be maintained, or a single set of notifications preferences may direct the output of notifications for each device. The notifications preferences includes a schedule option that allows a time period where the notifications may be specifically enabled or disabled automatically. In one embodiment, the notifications preferences control notifications only, and in other embodiments, the notification preferences control notifications and whether or not the devices themselves are enabled or operating (for example, turning a cell phone device off). A confirmation screen is provided that positively identifies whether the device(s) are RF enabled or not (and therefore safe to enter an airport, hospital, or other no RF zone).

20 Claims, 10 Drawing Sheets

METHOD AND APPARATUS FOR AUTOMATED FLEXIBLE CONFIGURING OF NOTIFICATIONS AND ACTIVATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

This invention relates generally to user interfaces. The invention is more particularly related to user interfaces for phone and Personal Digital Assistants (PDAs). And, the invention is yet more particularly related to combining phone and PDA user interfaces on a single processing device.

2. Discussion of Background

Personal computer systems and their applications have become common tools in modern society. To organize their lives, many personal computer users use personal information management applications such as an address book and a daily organizer on their personal computers. Although such applications have proven useful for personal information management, their utility is limited by the fact that the person must be sitting at their personal computer system to access the information.

To remedy this limitation, palmtop computers, electronic organizers and other handheld devices, commonly known as personal digital assistants (PDA's), have been introduced. The PDA is a computer that is small enough to be handheld or placed in a pocket, and allows a user and run various applications including personal information management applications such as address books, daily organizers, etc. These applications make people's lives easier.

Figure 1:
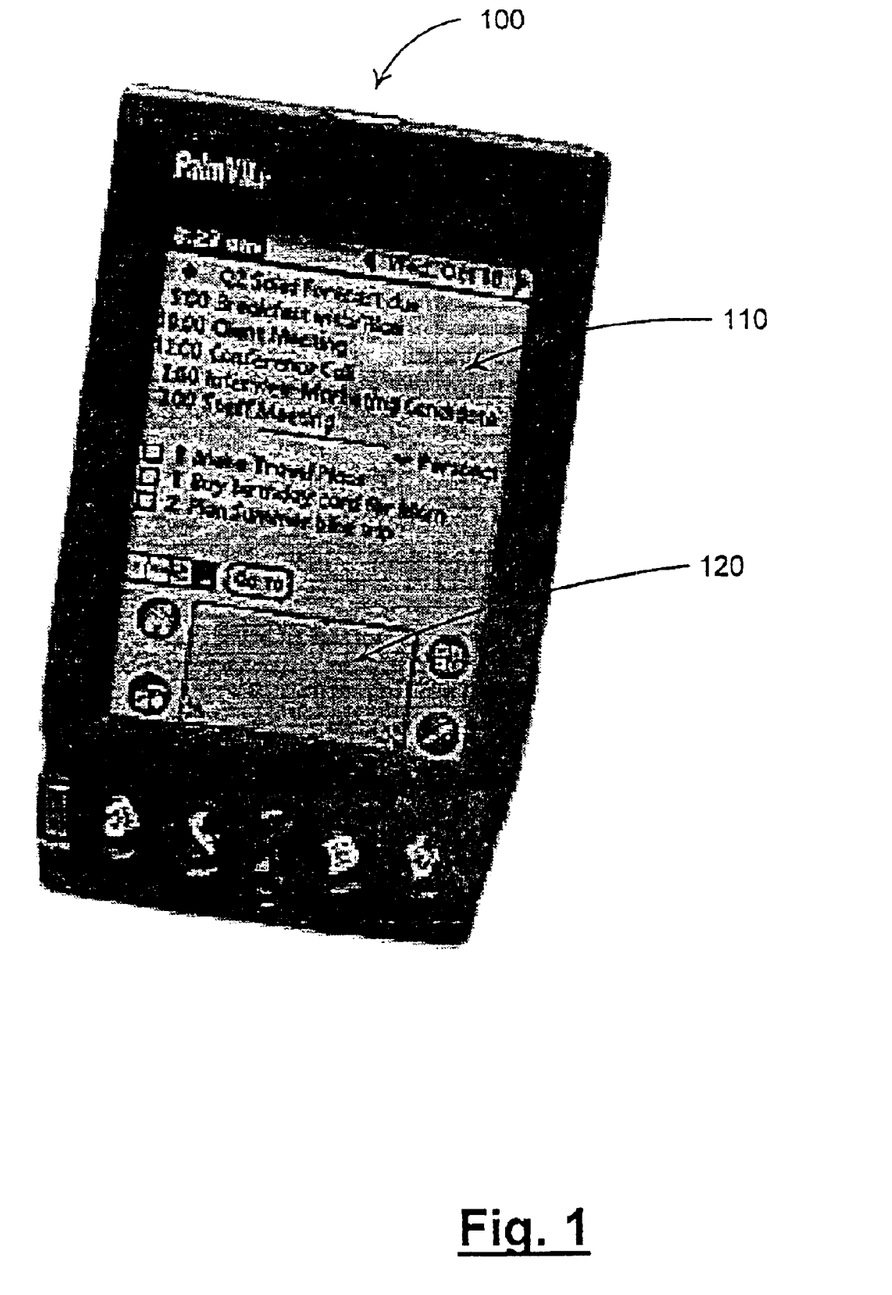
FIG. 1 is a Palm™ handheld computer.

A popular brand of PDA is the Palm™. However, the Palm™ is much more than a simple PDA. A basic configuration of the Palm™ 100 is shown in FIG. 1. This small, slim, device, about the size of your wallet, can hold 6000 addresses, 5 years of appointments, 1500 to-do items, 1500 memos, 200 e-mail messages, and can run many different software applications.

The front of the Palm™ 100 is a large LCD screen 110 which is touch-sensitive and allows a user to enter and manipulate data. A stylus (not shown) is provided with the Palm™ to help in making touch screen inputs. By using the stylus (or another handheld pointer) to interact with a touch-sensitive screen, a palmtop user can easily navigate through a host of built-in programs, software, and other applications.

Today, the Palm™, PDA and other handheld computing devices (Palm tops) offer Internet connectivity capabilities, as well as a vast array of hardware and software choices. Palmtops have evolved from simple organizers into a new kind of handheld that people use to instantly manage all kinds of information, from email, to medical data, to stock reports.

Mobile telephones (cell phones, PCS, satellite phones, etc) are also common tools in today's world. Many cell phones include rudimentary functionality for maintaining telephone numbers and other functionality to help alleviate the burdens associated with making calls and tracking phone numbers. In addition, the modern cell phone also has options for personalizing the style of various phone operations.

As one example, a common phone operation subject to style is ringing. The modern cell phone often offers a user the options of setting a specific ringer tone, music, or set the ringer to vibrate mode, for example.

However, despite the great capabilities and conveniences of the modern PDA, and the cell phone, many innovations are needed for expanding the capabilities and for increasing the convenience of using PDAs and cell phones.

SUMMARY OF THE INVENTION

The present inventors have realized a need for flexible configuration of notifications, activations and other items within electronic devices. The invention is best applied in a cell phone, or mobile PDA environment to improve the performance, convenience, and usability of PDA and/or other electronic devices.

The present invention is a PDA or other electronic device having that allows the user to control notification settings utilized by the device. The present invention provides a soft button method for affirmatively enabling or disabling RF devices within and/or attached to a PDA or other electronic device. In addition, instead of simply changing a cell phone from ringer to vibrate mode (when the user is at a meeting or classroom, for example), the present invention includes a device for programming the cell phone to be off for a selected time period (next hour, for example), or to automatically turn itself off on a regularly scheduled basis (from 3–5PM on Wednesdays, during class or a regularly scheduled staff meeting, for example).

Although the present invention may be described herein as a cell phone or other telephone device, the present inventors have realized that the present invention is particularly useful in both a cell phone, and a PDA environment, and that the combination of Cell Phone and PDA is also ideally suited for practicing the invention. In addition, the invention may be applied to any electronic device having any type of notification, but is particularly well suited to mobile electronic devices having RF capabilities. The invention includes a confirmation display that positively identifies RF devices as being disabled and therefore safe for use in airplanes, hospitals, and other no-RF zones.

The present invention is embodied as an electronic device, comprising a display screen; at least one component configured to initiate a user notifications based on events; a processor unit configured to, retrieve and display current preferences that indicate whether the notifications of said component are enabled or disabled, save preferences input by a user, and configure the electronic device to implement the saved preferences.

The present invention includes an electronic device, comprising, an RF check mechanism configured to, test at least one of internal and attached devices to determine if any of the tested devices are RF enabled, and produce a signal indicating an RF status of the tested devices, and a display mechanism coupled to said RF check mechanism and configured to display the indication of RF status.

The present invention includes a method of setting notifications on an electronic device, comprising the steps of, displaying user selectable notification options on a display screen of the electronic device, receiving an identifier indicating a user selected notification, and configuring notifications of the electronic device according to the user selected notification.

Portions of the present invention may be conveniently implemented on a general purpose computer, such as a modern PDA, Palm™, cell phone, satellite phone, or networked computers, and the results may be displayed on an output device connected to any of the general purpose, PDA, Palm™, networked computers, or transmitted to a remote device for output or display.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 2:
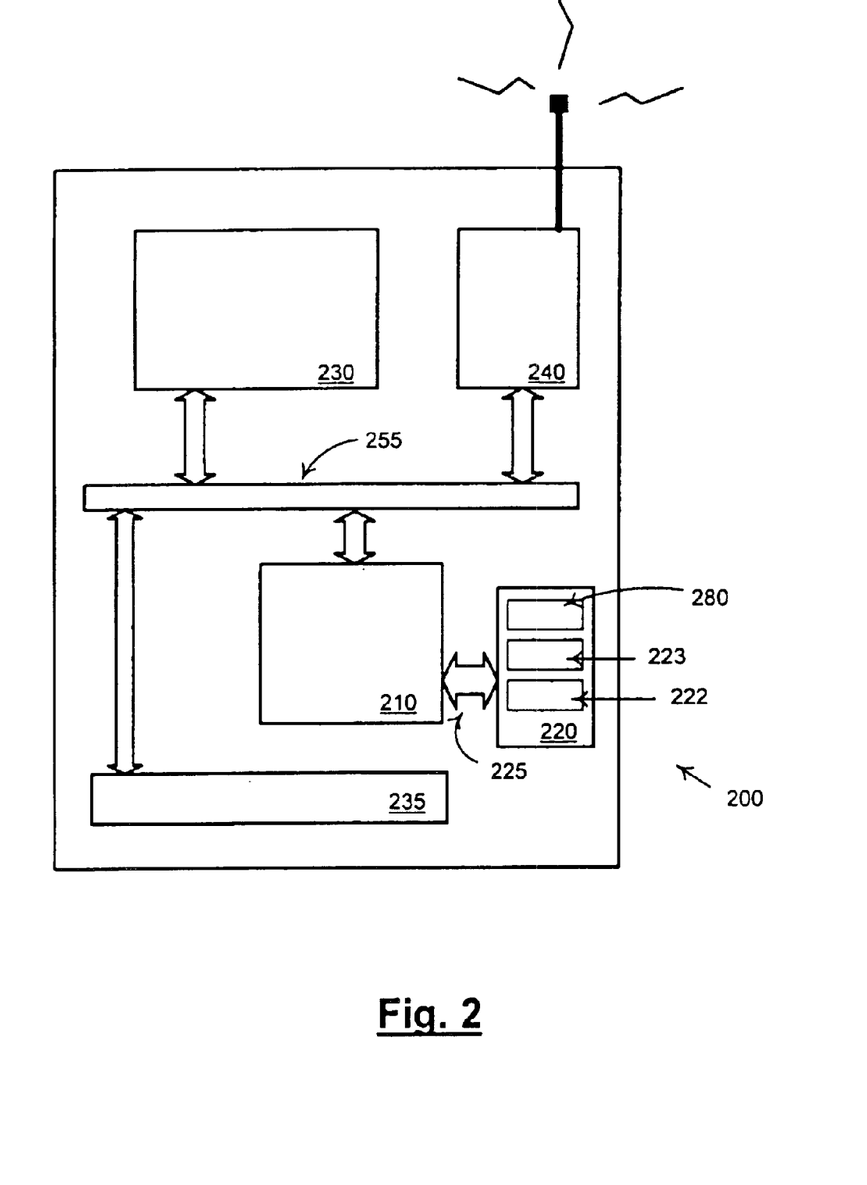
FIG. 2 is a block diagram of selected components of an embodiment of a PDA device with radio frequency (rf) capabilities according to the present invention.

Referring again to the drawings, wherein like reference numerals designate identical or corresponding parts, and more particularly to FIG. 2 thereof, there is illustrated a block diagram of selected components of a handheld computer 200 that includes cell phone technology. The handheld computer 200 includes a processing unit 210, for executing applications and an operating system of the computer 200, a memory device 220 for storing the operating system, data, and the applications. A memory bus 225 is utilized to transfer programs and data from memory to the processing unit 210.

A display screen 230 is provided (preferably a touch sensitive screen) for display of Operating System prompts, buttons, icons, application screens, and other data, and for providing user inputs via tapping or touching (or drawing in the Graffiti™ area 120) via a stylus or other touch mechanism. Hardware interface 235 connects to physical hard buttons and switches located on a body of the computer 200 and provides signals to applications running on the processing unit 210.

A mobile radio device 240 provides connectivity to a cellular telephone network (not shown). Alternatively the radio device may be a palm.net™ enabled radio device for wireless web-clipping, email, and other wireless connectivity communications. The radio device may also be a wireless Internet enabled radio device, such as Ricochet™, etc., pager, wireless e-mail device, Family Radio System (FRS), or any of different mobile telephones, including cellular, satellite, PCS, TDMA, GSM, etc. Although the radio device is shown as an internal component to the computer 200, the radio device may be contained in sled or other configuration that attaches to an exterior of the computer 200, or may be a separate device connected to the computer via a cable or other connection (wireless, IR, for example).

A system bus 255 carries data and commands to/from the processing unit 210 from/to other devices within or attached to the computer 200. For example, user applications running on the computer 200 send application screens and other data outputs to display screen 230 for display via the system bus 255. User inputs (Graffiti™ area drawing, or tap selection, for example) are detected by the screen 230 and sent to the processing unit 210 via the system bus 255.

In addition to the operating system and user selected applications, another application, a phone device (instructions stored in memory 220), executes on the processing unit 210. Phone calls from the network directed toward the mobile radio device 240 are detected by the mobile radio device and sent, in the form of an incoming call notification, to the phone device executing on the processing unit 210. The phone device processes the incoming call notification by notifying the user by an audio output such as ringing (not shown).

The phone device also includes a method for the user to answer the incoming call. For example, tapping on a phone icon, or pressing a hard button designated or preprogrammed for answering a call signals the phone device to send instructions (via system bus 255) to the mobile radio device 240 to answer the call.

Outgoing calls are placed by a user by entering digits of the number to be dialed and pressing a call icon, for example. The dialed digits are sent to the mobile radio device 240 along with instructions needed to configure the mobile radio device 240 for an outgoing call. Similarly, if the radio device is a web, palm.net, e-mail, or other rf communication device, appropriate instructions are sent to the radio device to instruct or otherwise administer the communication. The administration may provide a communication and a destination address to send the communication to the mobile radio device 240, or receiving an email and storing it in memory (memory 220, for example) or displaying it to a user.

Preferably, the computer 200 is a PDA device having interactive hardware and software that perform functions such as maintaining calendars, phone lists, and at least one voice or audio related functions integrated or attachably integrated (via a connector device, for example, not shown) so as to be configured for use with cellular telephone capabilities of the PDA. Several examples of a configuration and details of devices for connecting or integrating voice function devices to a PDA are described in Maes et al., application Ser. No. 09/675,872, entitled, "INTEGRATING VOICE FUNCTION INTO A PDA," filed Sep. 29, 2000, the contents of which are incorporated herein by reference in their entirety.

The software, including the phone device, operating system, and other applications (word processors, spreadsheets, games, databases, etc.) 223 are stored in memory device 220 along with program data, graphics, and other data and executed on the processing unit 210.

Processing unit 210 executes the software, including the operating system (OS, including a User Interface (UI) of the OS), and other user applications as directed by user inputs. The user applications display outputs on the display screen 230 and receive inputs from taps, tap & hold, and writing operations on the display screen and from programmed hard buttons attached to the hardware interface 235.

Memory device 220 is constructed of RAM memory or ROM memory, or a combination of both ROM and RAM, and may include flash memory components. An operating system 222 resides on a ROM portion of the memory 220 and provides executable instructions to perform operating system functions of the handheld computer 200. User applications 223 generally reside in a RAM portion of the memory 220. The present invention is contained in a program stored on ROM. However, the invention may also be programmed within the operating system 222, or may be a separate program contained in RAM or any other storage device (program 280, for example). When the present invention is invoked, computer instructions from the operating system 222 or program 280 are executed on processing unit 210 which issue commands that control the radio device 240 (enable/disable), or save a schedule for enabling/disabling the radio device.

The above describes a basic environment (a cell phone or a PDA with RF capabilities) in which the present invention is practiced. However, it should be understood that many different electronic devices, including cell phones, PDA's of different configurations and various integrated or attached devices and/or RF capabilities are also suitable environments in which the present invention may also be practiced.

Figure 3:
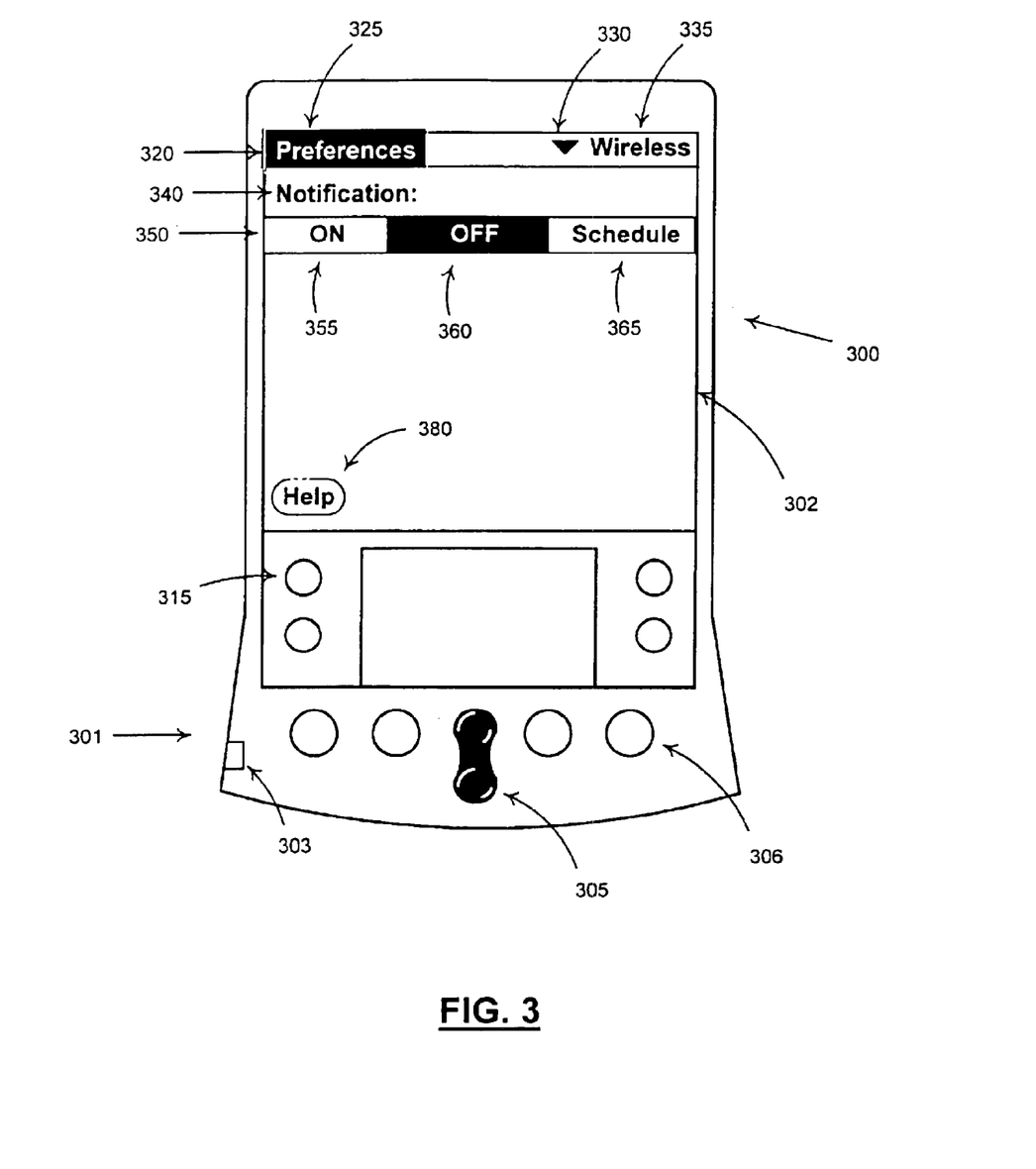
FIG. 3 is a screen shot on a Palm™ of an embodiment of a preferences notifications dialog according to the present invention.

FIG. 3 is a screen shot of a handheld computer device 300 executing an embodiment of the present invention and illustrating a notifications preference screen according to the present invention. The handheld computer includes a series of hard buttons 301 that are programmable or hardwired to activate/deactivate various functions of the handheld computer, including, for example, turning the computer on or off, activating operating system functions, activating programs, etc. (power button 303, rocker switch 305, and application button 306, for example). Touch sensitive areas 315 on the display screen 302 are also programmable to invoke various functions of the operating system or user applications of the handheld computer. A status bar 320 includes a general screen identifier 325 (preferences in this example), a preference panels list trigger (icon) 330, and a subcategory identification 335 (wireless in this example). The preference panels list trigger (icon) 330, when tabbed, brings a pull down menu that allows the user the option of switching to other preference screens (setting the time and date, entering user information, and other preferences, for example). A wireless preferences function 340 (notification in this example) is displayed along with various options 350 for setting wireless notification preferences for the wireless device. In this example, the preferences are being set for a general wireless device, however the preferences may be set for a palm.net type wireless device, or a cell phone, GSM phone, or other wireless communications or accessories that may be included with or attached to the handheld computer 300. Individual preference screens may be provided for each of multiple wireless devices. Alternatively, notification preferences for all the wireless devices may be combined and administered from a single screen simplifying the wireless preferences notifications selections that are required from the user.

In one embodiment, the application button 306, when pressed by a user brings up a user application preprogrammed by the operating system to be booted when application button 306 is pressed (a memo pad function, for example). However, if the application button 306 is held down for a 1st time period of approximately 1–2 seconds, a wireless preferences subprogram is launched and the display screen shown on display 302 in FIG. 3 is presented to the user. The time period that application button 306 is required to be held down to invoke the wireless preferences subprogram is selected by the developer. Any time period may be used.

User selectable options 350 include ON 355, OFF 360 and Schedule 365. Each of these are selectable options 350 are buttons displayed on the touch sensitive screen 302. However, any of the touch sensitive areas 315 or hard buttons 302 may also be programmed to perform the same functions (using the display screen 302 to advise the user on which buttons perform these functions, for example). If the ON button 355 is pressed, wireless capabilities of the handheld computer 300 and the devices wireless notifications is immediately turned on. Any LEDs or other indicating lights associated with an ON status of either the radio devices (wireless devices) or the notifications are also turned on as confirmation. After the ON button 355 is pressed, the devices wireless notifications will start immediately if messages, e-mails, telephone calls, etc. are received on any one or more wireless channels of the handheld computer 300.

If the OFF button 360 is pressed, the handheld computer 300 wireless notification and radio device(s) are immediately turned off. Again, any LEDs confirming notifications or the status of the radio device(s) are also turned off as confirmation. When the user presses off, the handheld computer 300 is no longer RF enabled and the radio is absolutely turned off, making the wireless device safe for entering no RF enabled device zones (such as airplanes and certain hospital areas, or when the user goes to bed or is in another area where the wireless device should not be used (classrooms, etc.)).

In one embodiment, the present invention includes a mechanism to assure the user or other personnel in no RF zones that the device is not RF enabled (Airplane Safe, for example). In this embodiment, the application button 306 is programmed to sense when it is held down for a 2nd time period of 2–3 seconds at which time the RF device is checked to assure that it is not RF enabled and a confirmation is displayed on the display screen 302. The airplane safe confirmation can be a message displayed in large letters) on the screen 302 stating "this device is airplane safe (all RF devices are shut down)". See FIG. 5A, for example. Alternatively, a graphic icon (airplane, for example) may be displayed. Conversely, after holding the applications button 306 down for the 2nd time period, and, if the device is RF enabled, the confirmation message would state, for example, "the device is RF enabled, please turn off RF device if on an airplane or in a hospital zone". And alternatively, a graphic icon such as that displayed on display screen 302 in FIG. 5B may be displayed. Again, the length of the 2nd time period is selected by the developer. As with all the time periods discussed herein, any time period may be utilized, so long as conflicts between different time periods do not occur or are otherwise resolved.

Figure 5A:
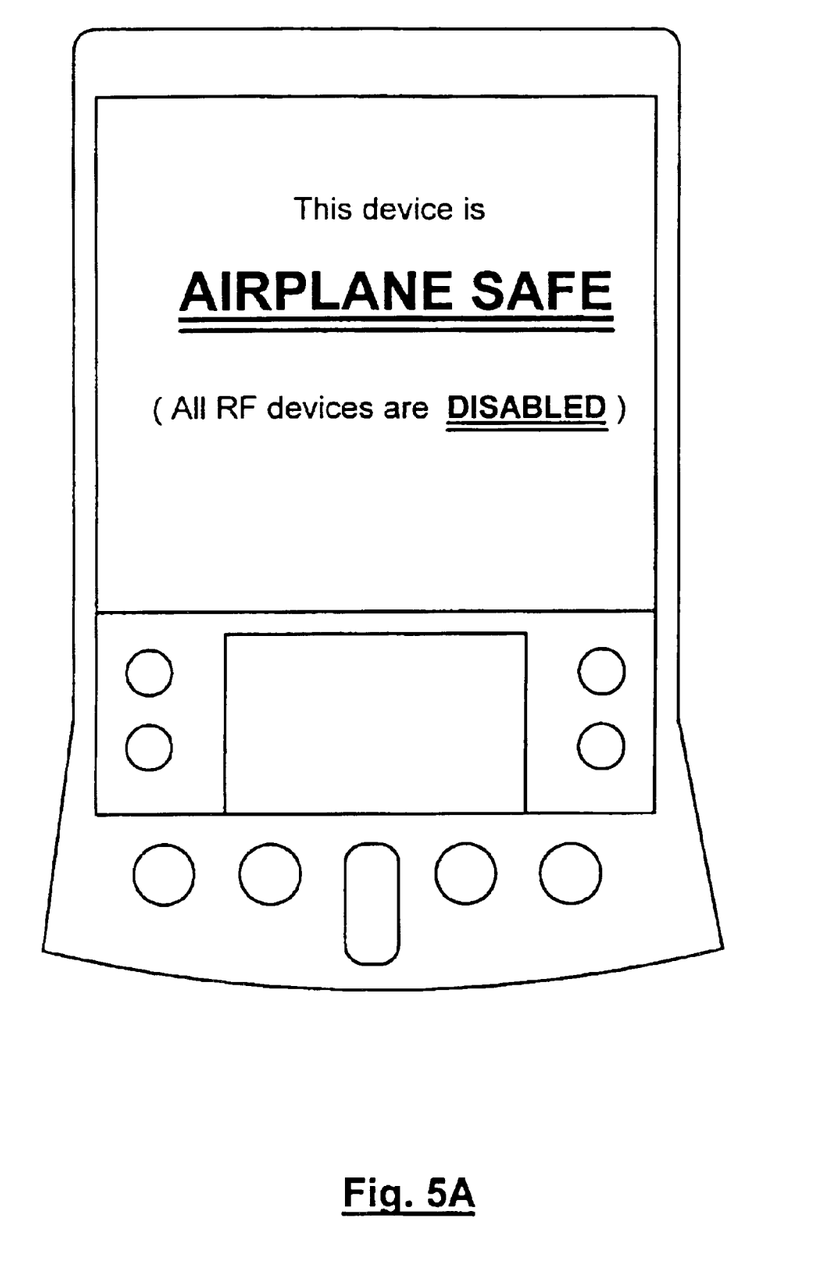
FIG. 5A is a screen shot of an example confirmation screen indicating that a PDA device having RF capability is airplane safe.
Figure 5B:
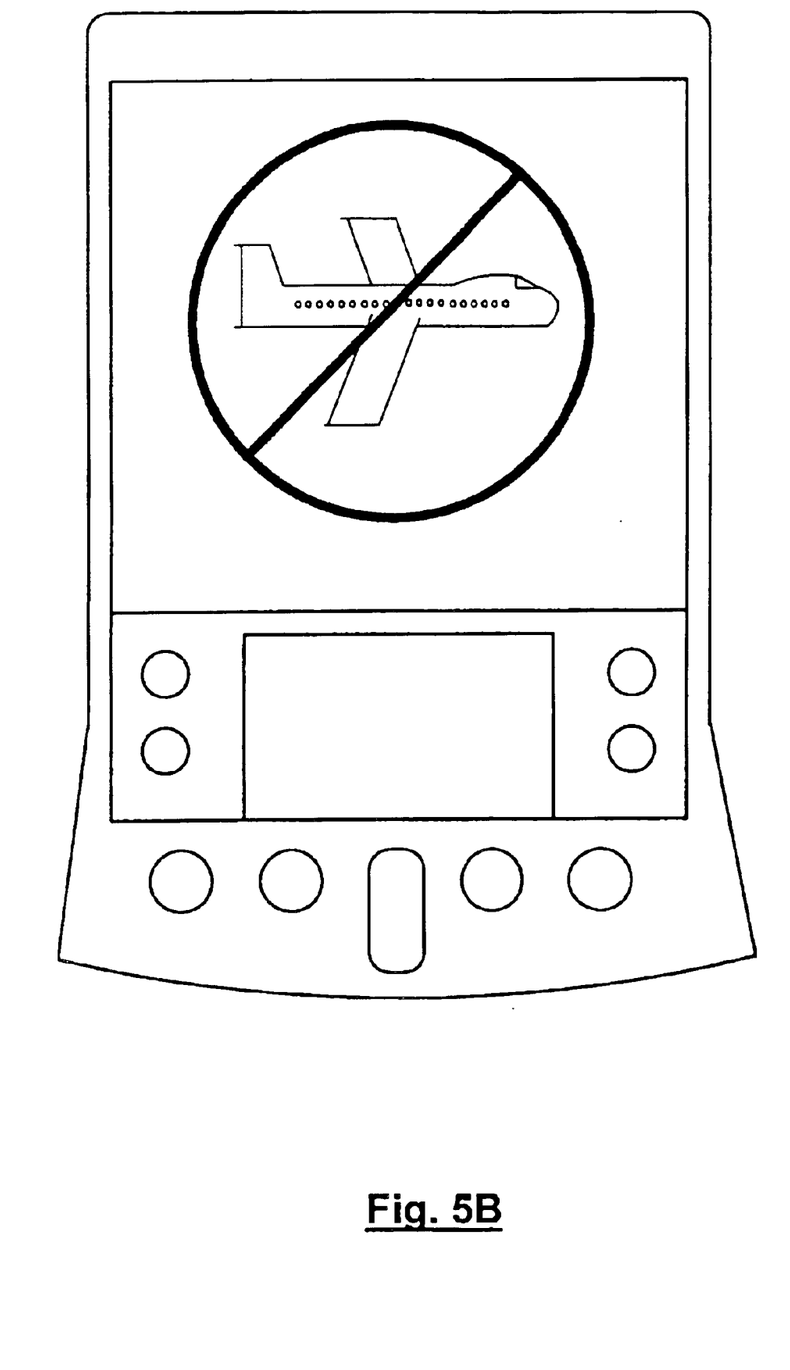
FIG. 5B is an example screen shot of a PDA having RF capability indicating the PDA is not airplane safe.

A feature of the present invention is to allow a user a quick method for checking a current status of the RF device. The process is to have a button pre-programmed to launch a check routine that tests the RF device and then displays a message, icon, or other indication of the RF status. In one embodiment, if the application button 306 is held down for a third time period (more than 3 seconds, for example), the check routine is invoked, and, if the RF device is not enabled, the appropriate indication is made (FIG. 5A, for example). If the RF device is enabled, a contrary indication occurs (FIG. 5B, for example).

Continuing now with FIG. 3, help button 380 when pressed will give the user specific directions on how to turn on or off the wireless device or set a schedule using the wireless preferences notification screen (FIG. 3, for example).

Figure 4:
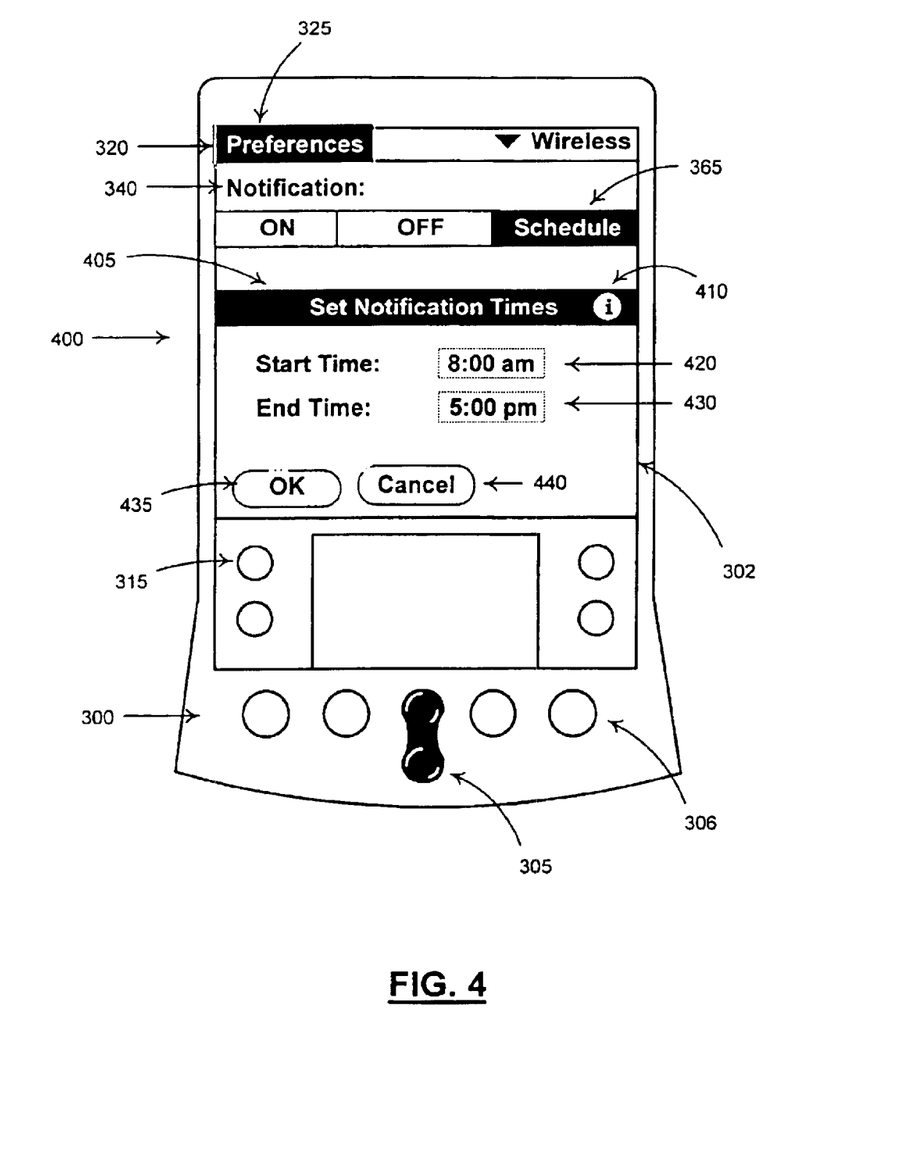
FIG. 4 is a screen shot on a Palm™ of an embodiment of a preferences set notification times dialog according to the present invention.

If the user presses the schedule button 365, a second dialog is displayed and the user can then confirm or set times that the user wants the wireless device and its related notifications to be set on and off. Turning now to FIG. 4, pressing the schedule button 365 brings up a set notifications times screen 400. The set notifications times screen 400 includes an identification bar 405 naming the screen. Information button ("i") 410, when pressed, provides specific information about the set notifications times (including, for example, information that might also be included in a help screen explaining how to use any of various options within the set notifications time screen). A start time area 420 provides the user an input area to indicate a start time when the RF device and notifications thereof are to be enabled. An end time area 430 provides the user an area where an end time when the RF device and its related notifications are to be disabled. In this embodiment, the start and end times indicate a time period between which the RF device and its associated notifications are to be enabled, and, in another embodiment, the start and end times indicate a period of time between which the RF device and its associated notifications are to be disabled.

Although the present invention has been described with respect to enabling and disabling RF device(s) and associated notifications, the present invention may also be utilized to enable and disable notifications, without necessarily enabling or disabling the RF device(s).

Once the start and end time of the set notification times screen dialog are set, the enabling and disabling of the RF device(s) and the associated notifications will be handled automatically by the programming and/or electronics of the present invention. In one embodiment, the user must press an OK button 435 before start and end times will be set. Start and end times entered by the user may be cancelled by pressing the cancel button 445 (so long as the cancelled button is pressed before OK, previously existing start and end times will not be changed).

Examples of notification times are likely to be scheduled by a user include regular periods of sleep of the user, scheduled classes or staff meetings, for example. In one embodiment, the set notifications times screen includes a date function that allows a user to select particular dates to be associated with the on/off and/or enabled/disabled times or to set recurring time intervals such as every Monday between 3:00 and 5:00 or each weekday between 1:00 p.m. and 2:00 p.m. for example. Thus the user is provided a flexible way to ensure that the cell phone or other RF device does not interrupt at times when it would be inconvenient or improper to have a notification alarm or buzzer occur.

Figure 6:
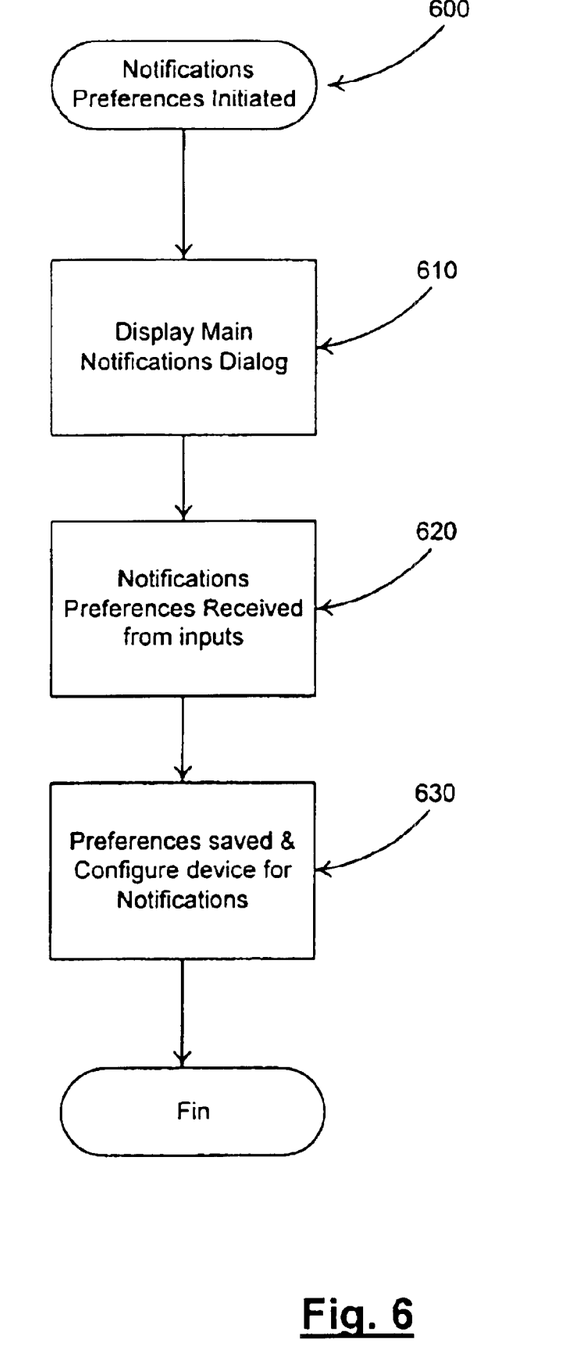
FIG. 6 is a flow chart illustrating an embodiment of a set notifications ON/OFF process according to the present invention.

FIG. 6 is a flow chart illustrating a high level process according to an embodiment of the present invention. At step 600 the user initiates the wireless notifications preferences function, by pressing the application button 306 for between 1–2 seconds, for example. The users actions are recognized by a program (OS 222, for example) and the main wireless notifications preferences dialog (see FIG. 3 for example) is displayed (step 610). User action such as selecting the ON button 355 or OFF button 360 are received (step 620) by the program of the present invention. At step 630, the received preferences are saved and the device (handheld computer 300, for example) is immediately configured according to those inputs.

Figure 7:
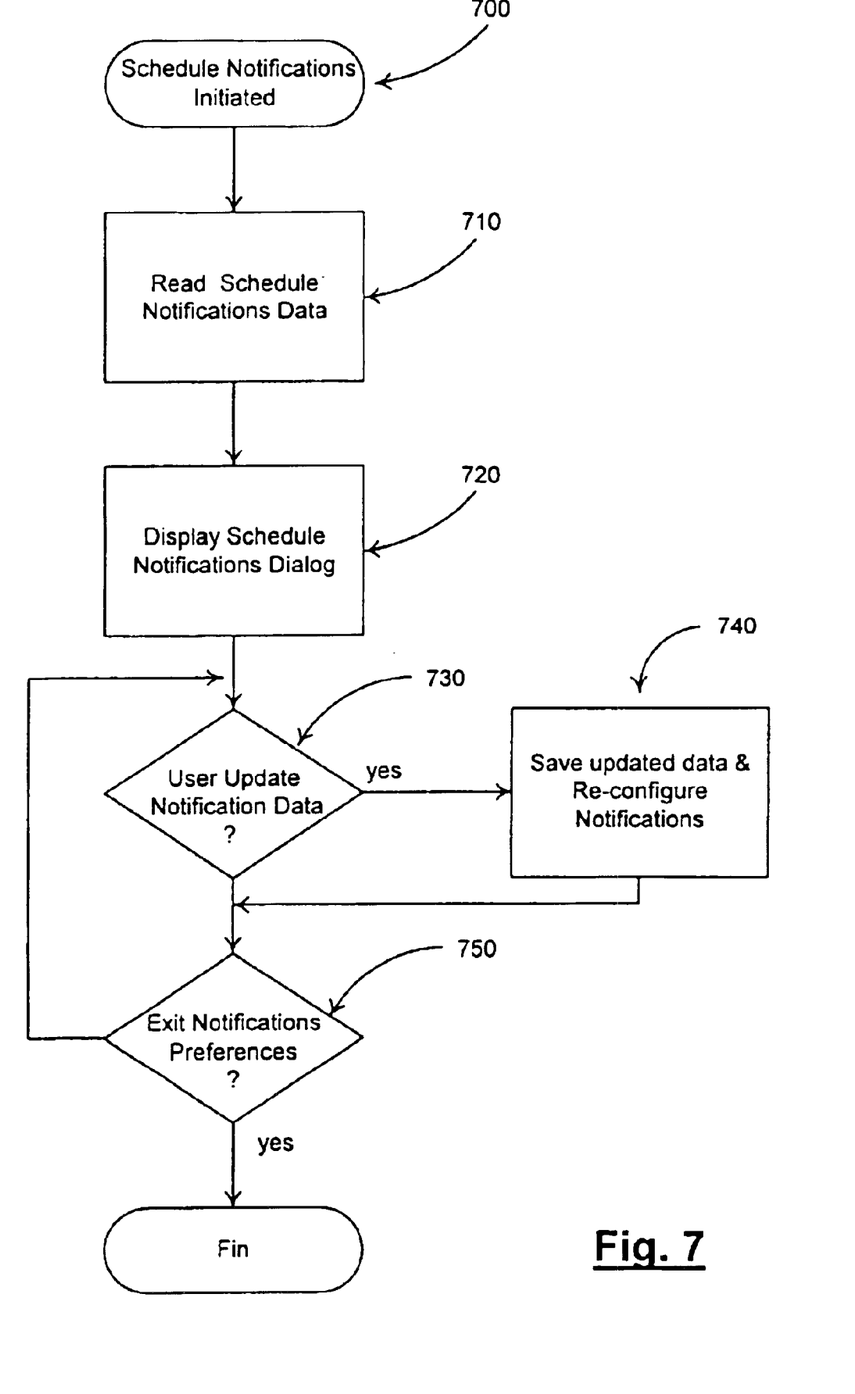
FIG. 7 is a flow chart illustrating an embodiment of a set scheduled notifications process according to the present invention.

FIG. 7 is a flow chart illustrating an embodiment of processing involved in setting scheduled notification times according to the present invention. At step 700, a user selects to set scheduled notification times (pressing schedule button 365, for example). At step 710, currently saved preferences for the scheduled notification times, if any, are read (from RAM memory portion of memory 220, for example). Current set notification times preferences are then displayed along with a set notification times dialog (set notification times dialog 400, for example). Step 730 through 750 are a loop where a user updates the set notification times (with a new start time, and/or a new end time and then pressing OK 435, for example), at which point new start/end times are saved and the device is configured according to the new times. In one embodiment, the set notification times dialog is exited on reconfiguration of the device (upon pressing OK for example). If the user makes an affirmative action to leave the set notifications screen (pressing cancel, or initiating another screen through one of the hard buttons or tapping another area of the screen, for example) the set notification times dialog is exited to bring up another function for example (without altering the previously set notification times). In another embodiment, as soon as the user enters a new start or stop time, it is saved and the PDA configures alarms to implement the new times.

Figure 8:
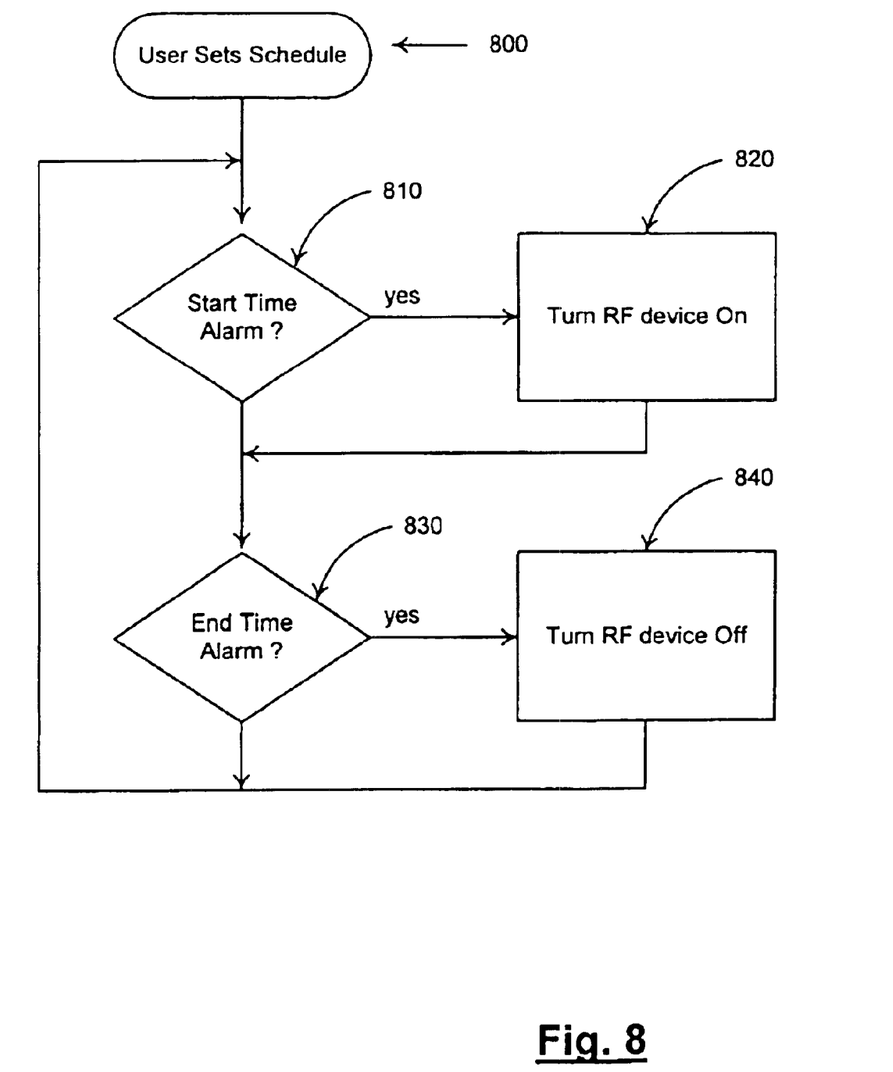
FIG. 8 is a flow chart illustrating an embodiment of a schedule implementation process according to the present invention.

FIG. 8 is a flow chart illustrating an embodiment of internal processing formed in accordance with the set notification times of the present dimension. When the device is configured based on the set notifications times, and internal OS alarm is set for each of the start and end times set on the set notifications times dialog. This is performed when the user sets the schedule (step 800) as described above. Assuming that the device is currently in an RF disabled state, at some point the start time alarm (an alarm set according to the start time of the set notification times screen) occurs (step 710). When the start time alarm occurs, the RF device and notifications are enabled (turn RF device on step 720). Now that the RF device and notifications are enabled, when the end time (set on the set notifications times dialog) is reached a second internal OS alarm occurs (step 730), and the RF device(s) and associated notifications are disabled (turn RF device off step 740).

Figure 9:
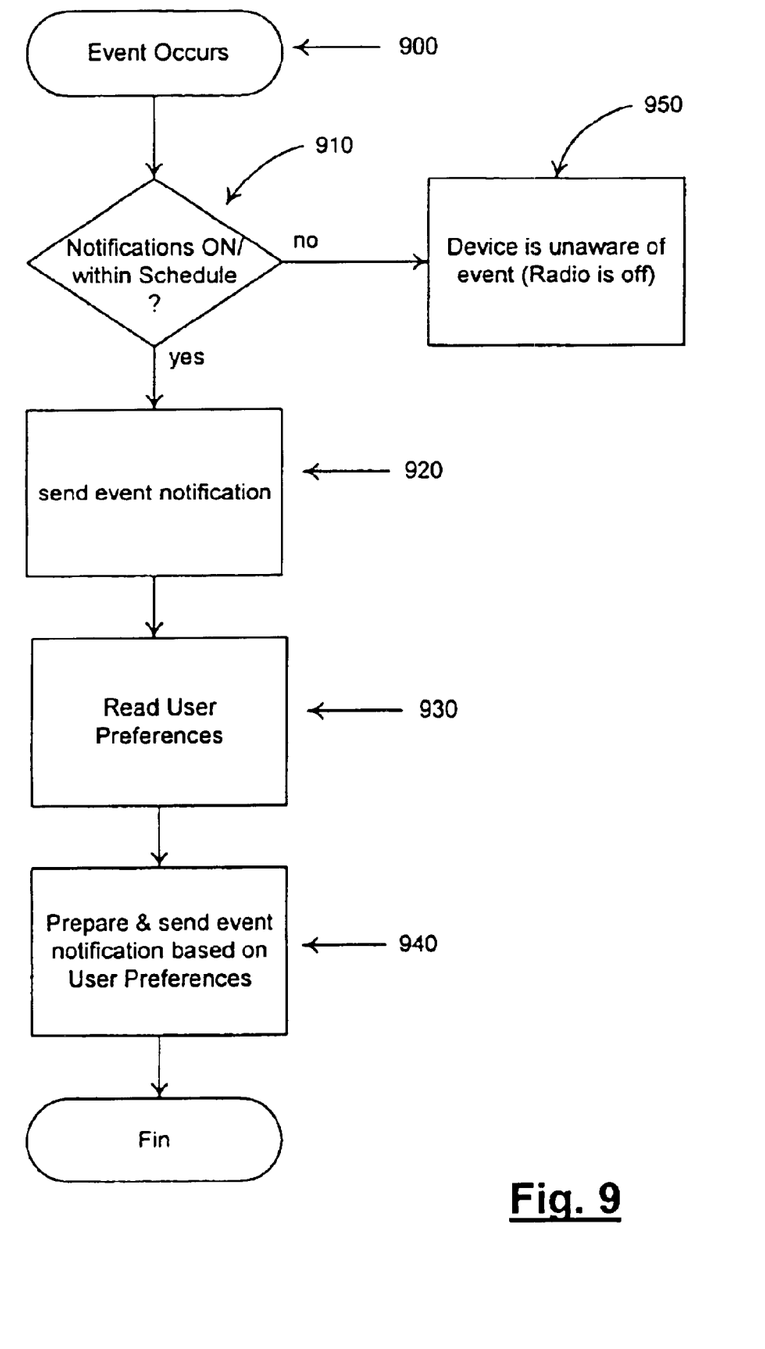
FIG. 9 is a flow chart illustrating an embodiment of an event notifications process according to the present inventions

FIG. 9 is an example embodiment of processing that occurs when an event occurs (step 900) requiring the RF device and/or a notification. If the notifications are on (user had previously pressed ON button 355, for example), or the event occurs within a schedule (as prescribed by the set notification times dialog 400, for example) (step 910), then, the event notification is initiated (step 920). After initiating the event notification, the user preferences are read (step 830), indicating the type of notification to be received (ringer, vibrator, etc.), and, at step 840, the event notification is activated (ringing a bell, or vibrating the device, for example). If at the time the event occurs, the notifications are off, or not within the schedule set by the user in the set notifications times dialog, the RF device is off and unaware of the event and no action occurs (step 850).

Alternatively, in the embodiment where the notification preferences are only applied to the event notification, the RF device is aware of the event, and, for example, facilitates recording of a voicemail notification or saving another indicator that the event had occurred. However, since notifications are off, no notification is sent to the user at this time. Once the scheduled notifications times do occur, or the user sets notifications to on, then an additional step may be taken to determine if any messages were received by the RF device during times when notifications were off and the user would then be notified.

In addition to turning notifications on and off, the processes of the present invention may also be applied to the manner in which notifications are received. For example, additional user options may be specified scheduled times and a type of notification. For example, setting notifications off every day between 11PM and 7AM, setting notifications to ring between 7:01AM and 10:59PM, and setting notifications to vibrate mode every Tuesday and Thursday from 1PM to 3PM, and every Wednesday from 5PM to 8PM.

In one embodiment, although the user sets the RF device(s) off (by pressing OFF button 360, for example) other functionality of the device 300 is still operable (PDA functions, games, applications, etc.).

Some RF devices connect to networks that save incoming messages when the RF device is disabled. In this case, after a period of RF device disablement, a user may receive one or more incoming communications (and notifications) upon enabling the RF device(s).

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, placing and receiving telephone calls or other communication operations, setting notifications on or off based on user inputs, including determining a scheduled time, setting alarms for waking processes for turning notification on/off and/or shutting down/activating RF device(s), providing RF disabled or enabled confirmations, and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. An electronic device, comprising:
   a display screen;
   at least one component configured to initiate user notifications based on events;
   a processor unit configured to,
   retrieve and display user modifiable
   preferences that indicate whether the notifications of said component are enabled or disabled,
   save preferences input by a user, and
   configure the electronic device to implement the saved preferences;
   wherein said component includes an RF device; and
   wherein said preferences include an indication of a RF status to display whether the RF device is enabled or disabled to render the electronic device safe for no RF zones.

2. The electronic device according to claim 1, wherein said component includes an RF device, and said preferences further indicate whether the RF device is enabled or disabled.

3. The electronic device according to claim 1, wherein:
   said preferences include a start time and a stop time; and
   said processing unit is further configured to enable said notifications according to the start and stop times.

4. The electronic device according to claim 3, wherein:
   the electronic device further comprises a clock mechanism; and
   said processing unit is configured to,
   set alarm times based on said start and stop times, and
   enable and disable said notifications according to the alarms.

5. The electronic device according to claim 3, wherein said electronic device includes an RF device, and enablement and disablement of said notifications also enables and disables said RF device.

6. The electronic device according to claim 5, further comprising:
   an RF enabled indicator that positively identifies if the electronic device is RF enabled or disabled.

7. The electronic device according to claim 1, wherein said preferences include start times, stop times, and a date identifier indicating a date and time period when notifications are to be either enabled or disabled.

8. The electronic device according to claim 7, wherein said date is a day of the week.

9. The electronic device according to claim 1, wherein the electronic device is a PDA centric device, and said component is a mobile telephone device.

10. An electronic device, comprising:

an RF check mechanism configured to, test at least one of internal and attached devices to determine if any of the tested devices are RF enabled, and produce a signal indicating an RF status of the tested devices; and a display mechanism coupled to said RF check mechanism and configured to display the indication of RF status;

wherein:

said display mechanism is a screen; and the indication of RF status is an airplane graphic indicating the RF status.

11. The electronic device according to claim 10, wherein said graphic includes at least a text message indicating the RF status.

12. The electronic device according to claim 10, wherein:

said display mechanism comprises an indicator light; and

RF enabled status is indicated by the indicator light being set on.

13. A method of setting notifications on an electronic device, comprising the steps of:

displaying user selectable notification options on a display screen of the electronic device;

receiving a user selected preferences option; and configuring notifications of the electronic device according to the user selected preferences option;

wherein said preferences include an indication of a RF status to display whether the RF device is enabled or disabled to render the electronic device safe for no RF zones.

14. The method according to claim 13, wherein:

said step of displaying comprises at least displaying an ON option and an OFF option.

15. The method according to claim 13, wherein said step of displaying includes displaying a start time, and a stop time; and said step of configuring includes enabling user notifications and said start time, and disabling user notifications a said stop time.

16. The method according to claim 15, wherein said step of displaying includes displaying a start date associated with said start time, and a stop date associated with said stop time.

17. The method according to claim 15, wherein said step of displaying includes displaying a day of the week associated with said start and stop times.

18. The method according to claim 13, wherein:

said method is embodied in compilable source code and stored on a computer readable media, that, when compiled and loaded into a computer, cause the computer to perform the steps of the method.

19. The method according to claim 18, wherein said electronic device is a PDA centric device, said computer readable media is a memory device inside the PDA.

20. The method according to claim 13, wherein:

said method is embodied in at least one of interpretable and executable software source code and stored on a computer readable media, that, when loaded into a computer, cause the computer to perform the steps of the method.

* * * * *

(12) INTER PARTES REEXAMINATION CERTIFICATE (1017th)
United States Patent
Skinner et al.

(10) Number: US 6,928,300 C1
(45) Certificate Issued: Dec. 23, 2014

(54) METHOD AND APPARATUS FOR AUTOMATED FLEXIBLE CONFIGURING OF NOTIFICATIONS AND ACTIVATION

(75) Inventors: Craig Skinner, Snohomish, WA (US); William Shu-woon Wong, Issaquah, WA (US); John Richard Brown, Lynnwood, WA (US)

(73) Assignee: Access Co., Ltd., Sarugaku-cho, Chiyoda-ku, Tokyo (JP)

Reexamination Request:
  No. 95/002,270, Sep. 14, 2012

Reexamination Certificate for:
  Patent No.: 6,928,300
  Issued: Aug. 9, 2005
  Appl. No.: 09/710,156
  Filed: Nov. 9, 2000

(51) Int. Cl.
  *H04M 3/00* (2006.01)
(52) U.S. Cl.
  USPC ...... 455/556.2; 340/4.5; 455/418; 455/422.1; 455/566; 708/109
(58) Field of Classification Search
  None
  See application file for complete search history.

(56) References Cited

To view the complete listing of prior art documents cited during the proceeding for Reexamination Control Number 95/002,270, please refer to the USPTO's public Patent Application Information Retrieval (PAIR) system under the Display References tab.

*Primary Examiner* — Scott L. Weaver (57) ABSTRACT

A preferences option maintains preferences for enabling and disabling notifications for device(s) of an electronic device. The notifications are for any of e-mails, phone calls, or other communications, or events (datebook alarms, for example). One or more devices may produce notifications, and individual preferences for each device may be maintained, or a single set of notifications preferences may direct the output of notifications for each device. The notifications preferences includes a schedule option that allows a time period where the notifications may be specifically enabled or disabled automatically. In one embodiment, the notifications preferences control notifications only, and in other embodiments, the notification preferences control notifications and whether or not the devices themselves are enabled or operating (for example, turning a cell phone device off). A confirmation screen is provided that positively identifies whether the device(s) are RF enabled or not (and therefore safe to enter an airport, hospital, or other no RF zone).

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-9 and 13-20 are cancelled.

Claims 10-12 were not reexamined.

\* \* \* \* \*